(12) United States Patent
Ahmed et al.

(10) Patent No.: US 11,425,736 B2
(45) Date of Patent: Aug. 23, 2022

(54) SELECTING A SEMI-PERSISTENT SCHEDULING INTERVAL FOR GRANT-FREE WIRELESS DEVICES

(71) Applicant: Telefonaktiebolaget LM Ericsson (publ), Stockholm (SE)

(72) Inventors: Saad Naveed Ahmed, Sundbyberg (SE); Biruk Silase Geletu, Hässelby (SE); Fredrik Söderberg, Huddinge (SE); Pu Yao, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 38 days.

(21) Appl. No.: 17/041,337

(22) PCT Filed: Mar. 26, 2018

(86) PCT No.: PCT/CN2018/080485
§ 371 (c)(1),
(2) Date: Sep. 24, 2020

(87) PCT Pub. No.: WO2019/183754
PCT Pub. Date: Oct. 3, 2019

(65) Prior Publication Data
US 2021/0084668 A1    Mar. 18, 2021

(51) Int. Cl.
*H04W 72/12* (2009.01)
*H04W 72/04* (2009.01)
*H04W 72/08* (2009.01)

(52) U.S. Cl.
CPC ......... *H04W 72/12* (2013.01); *H04W 72/042* (2013.01); *H04W 72/0486* (2013.01); *H04W 72/087* (2013.01)

(58) Field of Classification Search
CPC    H04W 72/12; H04W 72/042; H04W 72/0486
USPC ......................................... 370/329
See application file for complete search history.

(56) References Cited

U.S. PATENT DOCUMENTS

| 9,408,192 B2 | 8/2016 | Ohta et al. |
| 2013/0148597 A1 | 6/2013 | Lee et al. |
| 2013/0294247 A1 | 11/2013 | Zhu et al. |

FOREIGN PATENT DOCUMENTS

| CN | 101742427 A | 6/2010 |
| CN | 102131297 A | 7/2011 |
| CN | 107580340 A | 1/2018 |
| EP | 3282794 A1 | 2/2018 |

(Continued)

OTHER PUBLICATIONS

Extended European Search Report issued for Application No./Patent No. 18912361.5-1215 / 3777415 PCT/CN2018080485—dated Oct. 20, 2021.

(Continued)

*Primary Examiner* — Angel T Brockman
(74) *Attorney, Agent, or Firm* — Baker Botts, LLP

(57) ABSTRACT

According to certain embodiments, a method by a network node for selecting a semi-persistent scheduling (SPS) interval for a wireless device in a cell served by the network node includes determining criterion for selecting the SPS interval for the wireless device. The criterion is associated with at least one of a QoS requirement of the wireless device and a utilization of resources by the network node. The network node assigns the SPS interval to the wireless device based on the criterion.

15 Claims, 12 Drawing Sheets

(56) References Cited

FOREIGN PATENT DOCUMENTS

WO     2016 182349 A1    11/2016
WO     2017172479 A1    10/2017

OTHER PUBLICATIONS

3GPP TSG-RAN WG2 RAN2#101; Athens, Greece; Source: Ericsson; Title: RRC reconfiguration of SPS-Config (Tdoc R2-1803537)—Feb. 26-Mar. 2, 2018.
PCT International Search Report issued for International application No. PCT/CN2018/080485—dated Dec. 29, 2018.
PCT Written Opinion of the International Searching Authority for International application No. PCT/CN2018/080485—dated Dec. 29, 2018.

SELECTING A SEMI-PERSISTENT SCHEDULING INTERVAL FOR GRANT-FREE WIRELESS DEVICES

PRIORITY

This nonprovisional application is a U.S. National Stage Filing under 35 U.S.C. § 371 of International Patent Application Serial No. PCT/CN2018/080485 filed Mar. 26, 2018 and entitled "SELECTING A SEMI-PERSISTENT SCHEDULING INTERVAL FOR GRANT-FREE WIRELESS DEVICES" which is hereby incorporated by reference in its entirety.

TECHNICAL FIELD

Certain embodiments of the present disclosure relate, in general, to wireless communications and more particularly to selecting a semi-persistent scheduling (SPS) interval for grant-free wireless devices.

BACKGROUND

In cellular wireless systems, such as Long Term Evolution (LTE) and New Radio (NR) standards in 3GPP, resources for uplink (UL) transmissions are normally scheduled by the network node, which may include an eNB or gNB. This can be done dynamically where, for example, the eNB schedules the UL transmission per transmission occasion. The transmission occasion may include a transmission time interval (TTI) or multiple TTIs in the case of TTI bundling. Alternatively, this can be done using the semi-persistent scheduling (SPS) framework so that multiple periodic occasions are granted at the same time prior to a data transmission. The configuration of SPS includes a periodicity of the grant, allocation in time and frequency, and modulation and coding scheme (MCS) in subsequent SPS occasions.

SPS was enhanced in LTE rel-14 to support latency reduction of UL data transmissions. Compared to UL dynamic scheduling, SPS can do UL transmission much more quickly, since the user equipment (UE) need not transmit a scheduling request and the eNodeB (eNB) need not respond with an UL dynamic grant.

To further reduce latency, the periodicity may be reduced to a minimum value such as, for example, one TTI in LTE. In pre Rel-14, if the buffer is empty, then the UE needs to send a padding on the allocated SPS resources. With such a low periodicity, the likelihood of the buffer being empty increases, and sending padding at every TTI introduces many un-necessary interferences. Consequently, the option of skipping UL data transmissions when the buffer is empty has been introduced. However, even where the UL data transmissions are skipped, the configured resources are still reserved for the UE. This may lead to inefficient resource utilization.

In New Radio (NR), which is currently being specified in 3GPP, the principle of allocating periodic UL transmission resources in SPS is adopted. It is discussed under the name "UL transmission without grant." Some further features are added to support low latency and high reliability requirements.

Two types of UL transmission without grant have been specified. According to Type 1 UL data transmission without grant, resource configuration is based only on Radio Resource Control (RRC) (re)configuration without any L1 signaling. Type 2 UL data transmission without grant is quite similar to LTE SPS, which is based on both RRC configuration and L signaling for the activation/deactivation of the UL resources.

There exist certain challenges. For example, configuring all UEs in a cell with the same 1 ms short-SPS interval for the purpose of reducing latency leads to very high utilization of scheduling resources and increased processing. If a large number of UEs are being served in a cell and all the UEs are assigned a 1 ms short SPS interval, resource consumption may be too high. As another example, it is difficult to find a balance between resource consumption, which is typically higher with shorter SPS intervals, and latency. Currently, it is not clear how such UEs can be differentiated on SPS interval level by the eNB.

SUMMARY

Certain aspects of the present disclosure and their embodiments may provide solutions to these or other challenges. Specifically, techniques are provided for selecting a semi-persistent scheduling (SPS) interval for a grant-free type of transmission from a wireless device.

According to certain embodiments, a method by a network node for selecting a semi-persistent scheduling (SPS) interval for a wireless device in a cell served by the network node includes determining criterion for selecting the SPS interval for the wireless device. The criterion is associated with at least one of a QoS requirement of the wireless device and a utilization of resources by the network node. The network node assigns the SPS interval to the wireless device based on the criterion.

According to certain embodiments, a network node is provided for selecting a SPS interval for a wireless device in a cell served by the network node. The network node includes memory storing instructions and processing circuitry configured to execute the instructions to cause the network node to determine criterion for selecting the SPS interval for the wireless device. The criterion is associated with at least one of a QoS requirement of the wireless device and a utilization of resources by the network node. The SPS interval is assigned to the wireless device based on the criterion.

Certain embodiments may provide one or more of the following technical advantages. As an example, an advantage of certain embodiments may be that a short-SPS interval may be selected using a scheme that considers the QoS requirements of a wireless device as well as the resource situation of the eNB. Another advantage may be that the scheme provides options for selecting the most suitable criteria. Still another advantage may be that selection of a SPS interval may allow for prioritizing a wireless device over other wireless devices. Yet another advantage may be that where the load at the eNB is low, all wireless devices in a cell may be scheduled with a 1 ms interval.

Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described in FIGS. 1-12 of the drawings, like numerals being used for like and corresponding parts of the various drawings.

Certain embodiments may include functionality for selecting a semi-persistent scheduling (SPS) interval depending on one or more of a type of the wireless device, a Quality of Service Class Identifier, and the load of the network node for achieving low latency.

Figure 1:
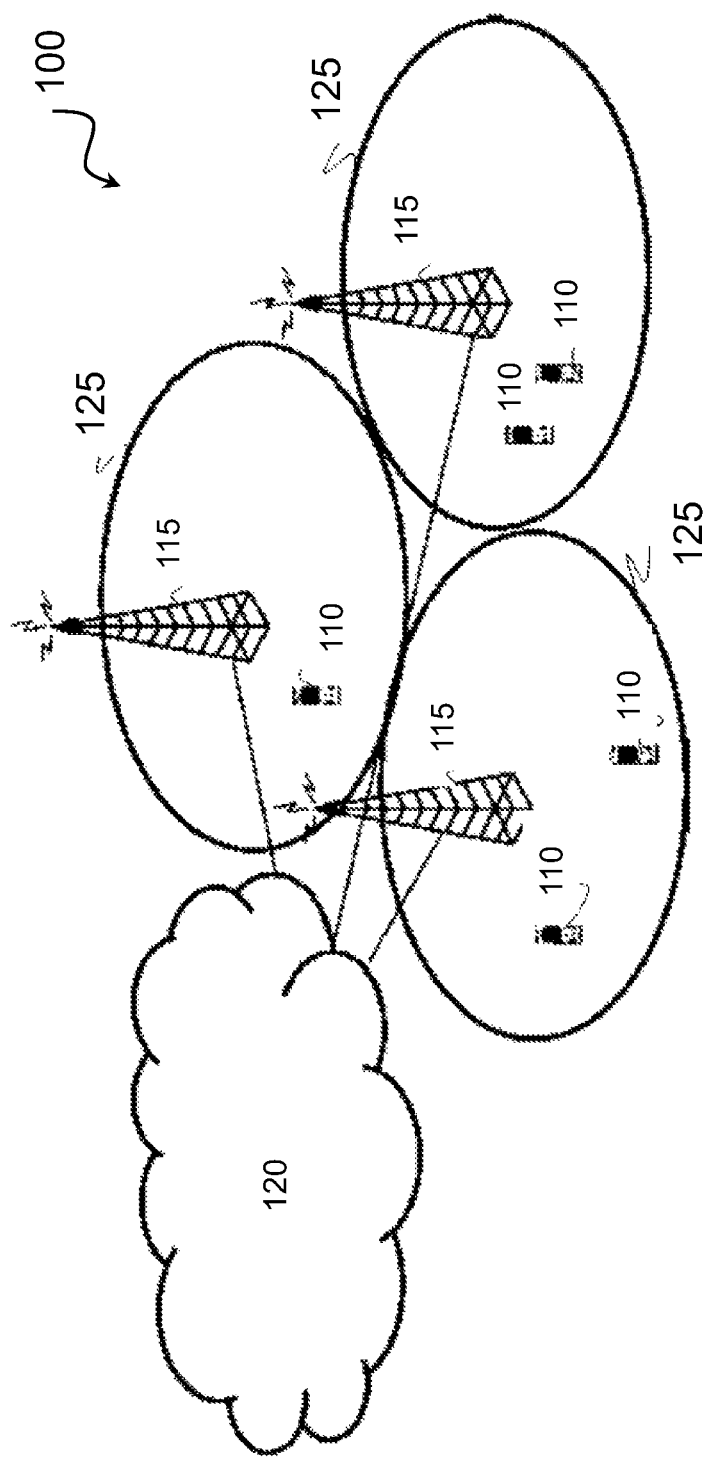
FIG. 1 illustrates an example wireless network for selecting a semi-persistent scheduling (SPS) interval for a grant-free type of transmission from a wireless device, according to certain embodiments.

FIG. 1 is a block diagram illustrating an embodiment of an example wireless network 100 for sharing frequency resources between grant-free and grant-based UL transmissions, in accordance with certain embodiments. As used herein, the terms UL transmission "without grant" or "grant-free" are both used herein to refer to either of the type 1 or type 2 schemes explained above. Also, the terms "configured grant" or "semi-persistent scheduling" are used to describe the same or similar concepts where the described techniques may be applied.

Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110, network nodes 115, and other network nodes (such as radio network controller or core network node) are described in more detail with respect to FIGS. 2, 3, and 8, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for sharing and differentiating grant-free and grant-based UL transmissions described herein are applicable to both LAA LTE and standalone LTE operation in license-exempt channels. The described techniques are generally applicable for transmissions from both network nodes 115 and wireless devices 110.

Figure 2:
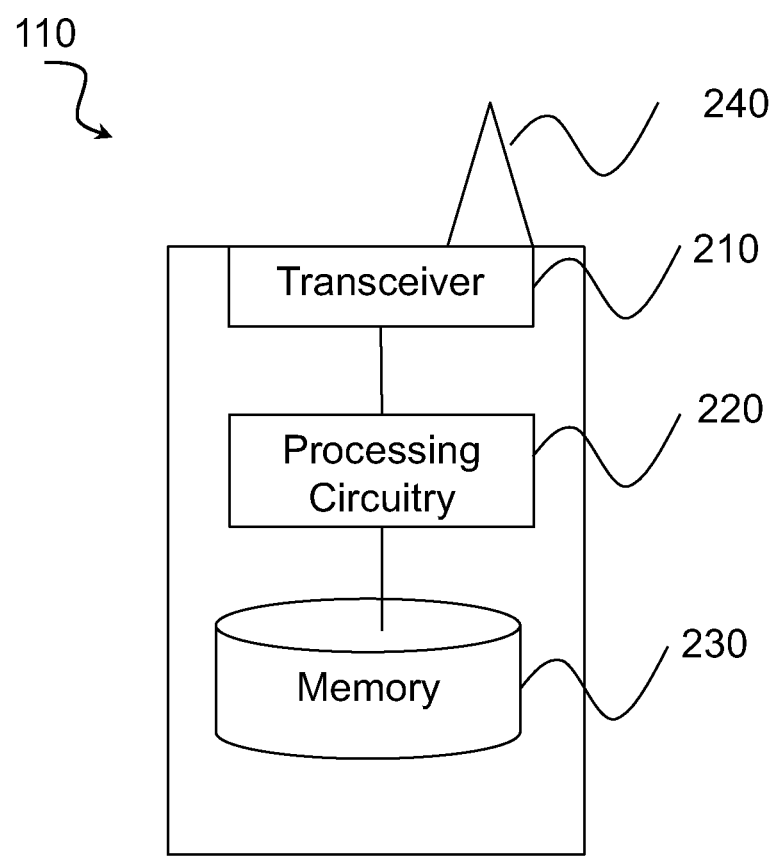
FIG. 2 illustrates an example wireless device, according to certain embodiments.

FIG. 2 is a block schematic of an exemplary wireless device 110 for sharing frequency resources between grant-free and grant-based UL transmissions, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 210, processing circuitry 220, and memory 230. In some embodiments, transceiver 210 facilitates transmitting wireless signals to and receiving wireless signals from network node 115 (e.g., via antenna 240), processing circuitry 220 (e.g., which may include one or more processors) executes instructions to provide some or all of the functionality described above as being provided by wireless device 110, and memory 230 stores the instructions executed by processing circuitry 220.

Processing circuitry 220 may include any suitable combination of hardware and software implemented in one or more modules to execute instructions and manipulate data to perform some or all of the described functions of wireless device 110, such as the functions of UE 110 (i.e., wireless device 110) described herein. In some embodiments, processing circuitry 220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 220.

Other embodiments of wireless device 110 may optionally include additional components beyond those shown in FIG. 2 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 220. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 3:
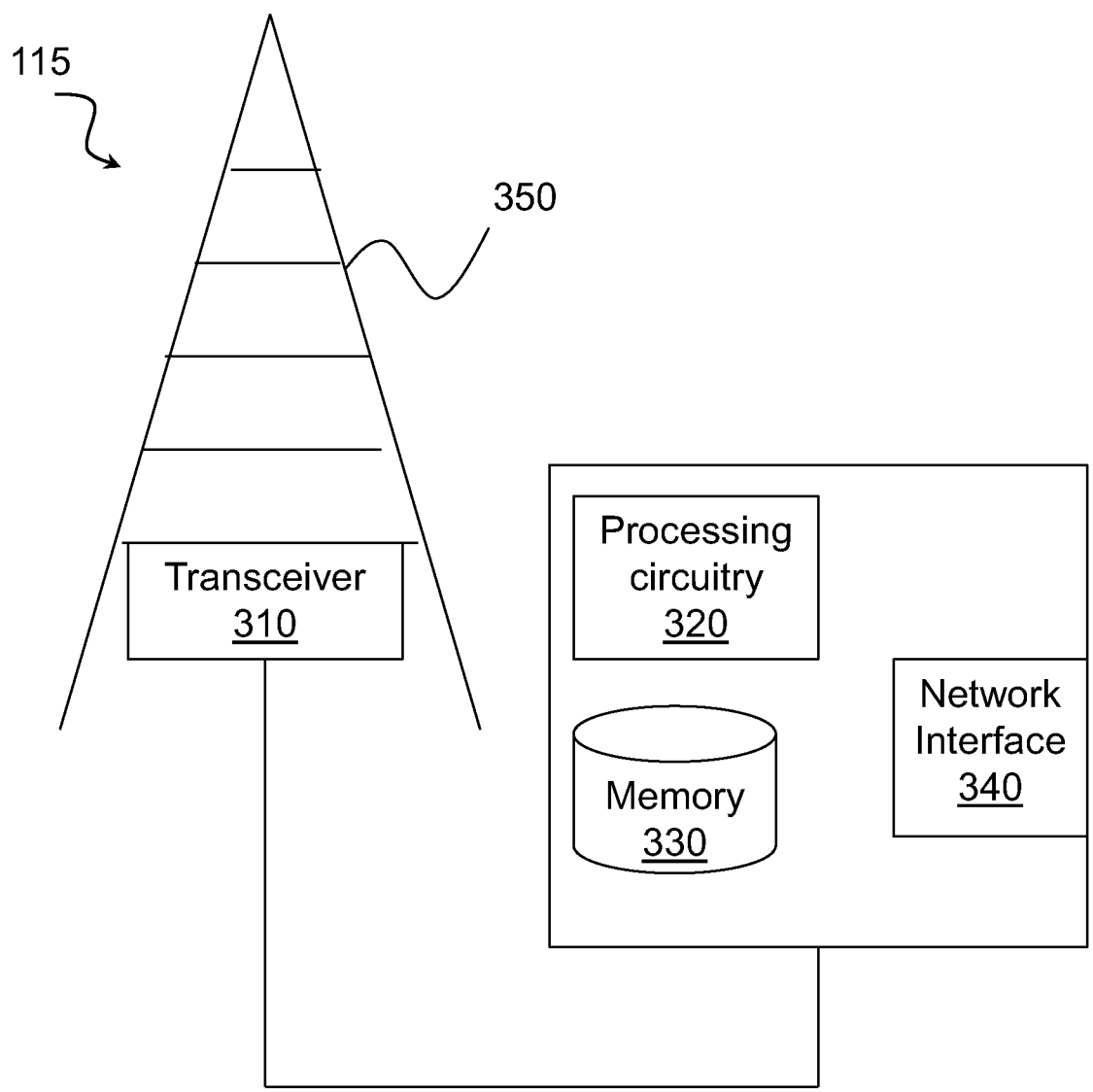
FIG. 3 illustrate an example network node for selecting a SPS interval for a grant-free type of transmission from a wireless device, according to certain embodiments.

FIG. 3 illustrates an example network node 115 for differentiating grant-free and grant-based UL transmissions that share one or more frequency resources, in accordance with certain embodiments. Network node 115 may be any type of radio network node or any network node that communicates with a UE and/or with another network node. Examples of network node 115 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320 (e.g., which may include one or more processors), memory 330, and network interface 340. In some embodiments, transceiver 310 facilitates transmitting wireless signals to and receiving wireless signals from wireless device 110 (e.g., via antenna 350), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers, etc.

Processing circuitry 320 may include any suitable combination of hardware and software implemented in one or more modules to execute instructions and manipulate data to perform some or all of the described functions of network node 115, such as those described herein. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 3 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 4A:
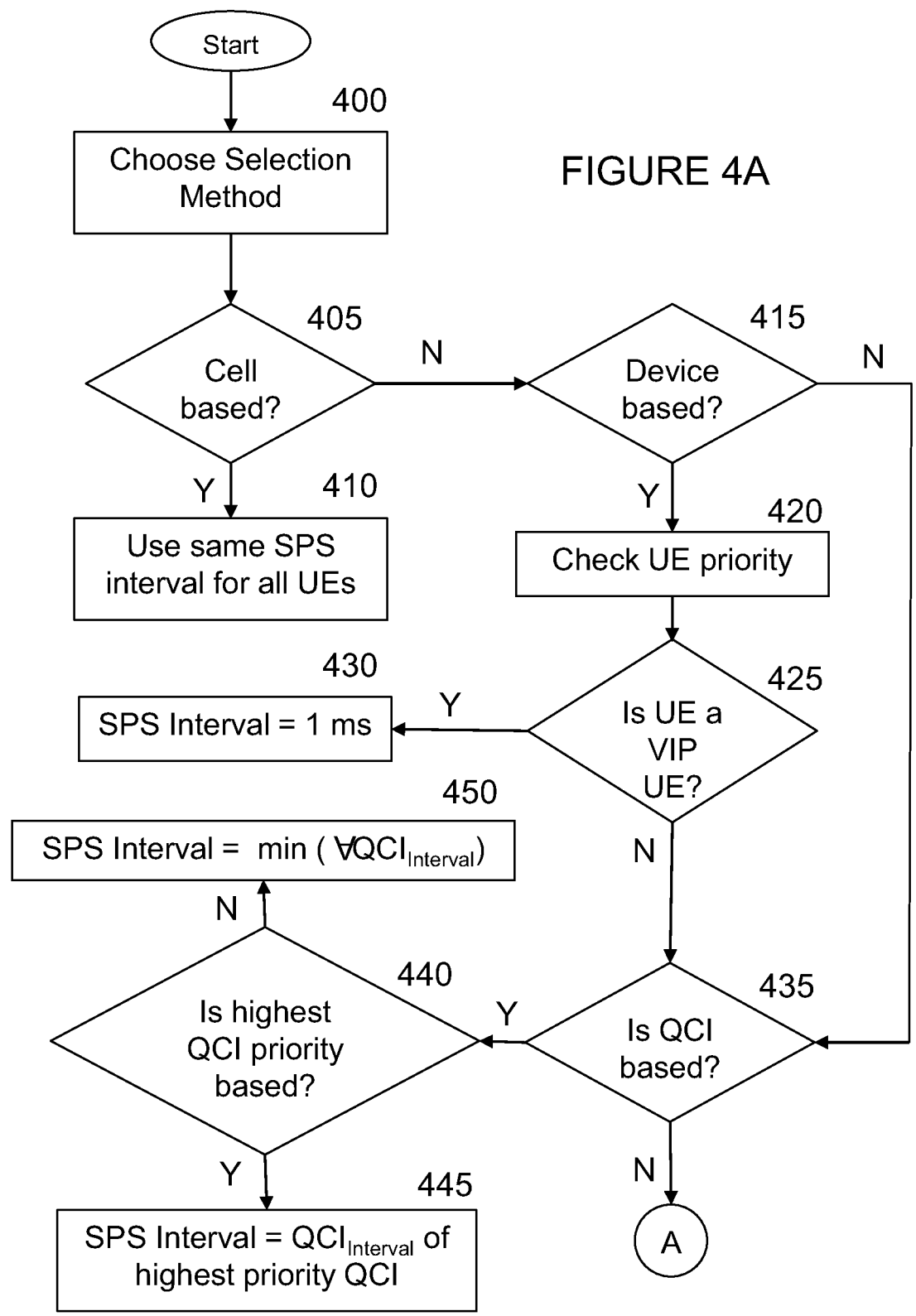
FIGS. 4A-4B illustrate an example method by a network node for selecting a SPS interval for a grant-free type of transmission from a wireless device, according to certain embodiments.
Figure 4B:
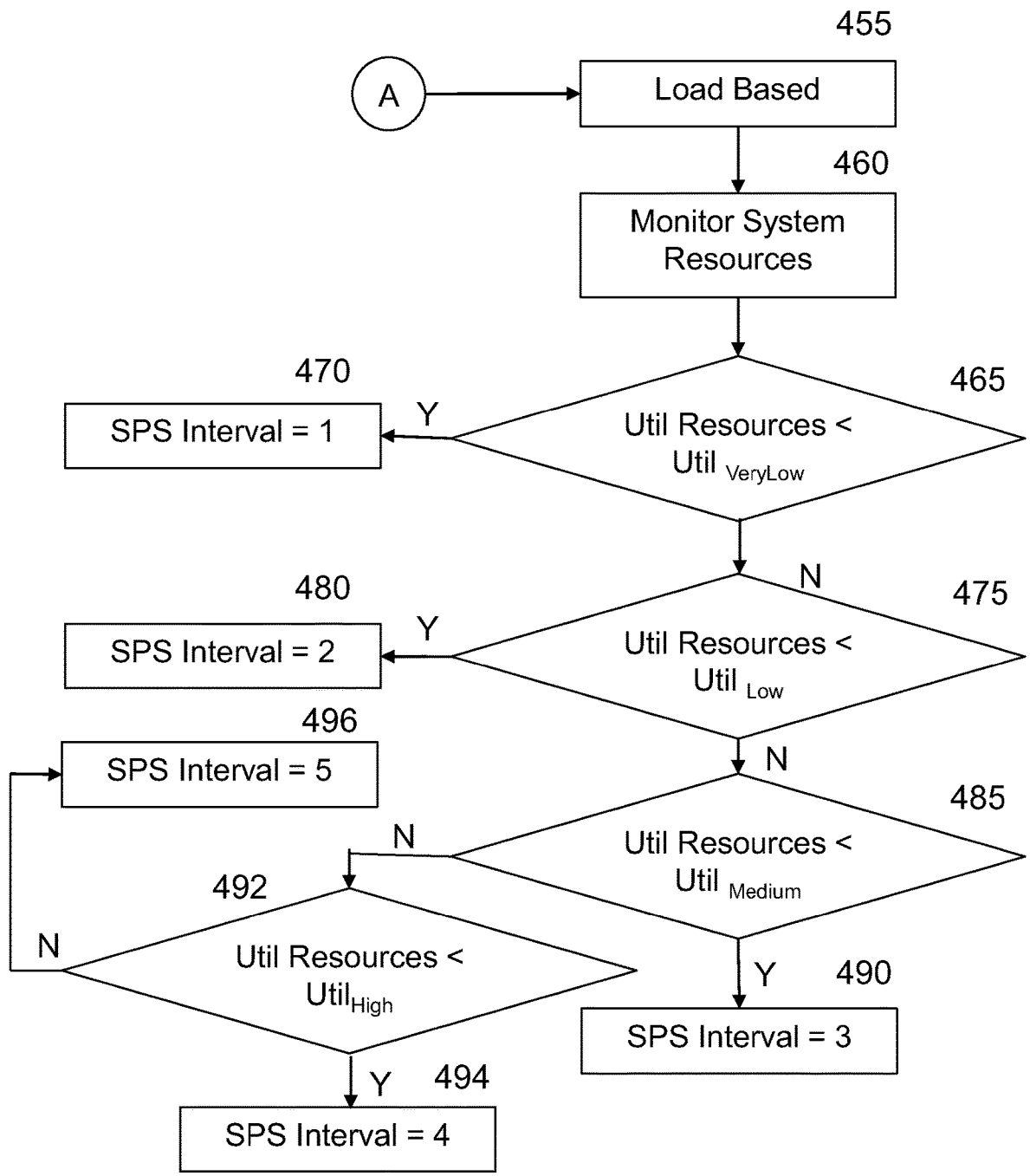

FIGS. 4A-4B illustrates an example method by a network node 115 for selecting a SPS interval for a grant-free type of transmission from a wireless device, according to certain embodiments. The method begins at step 400 when network node 115 chooses a method for selecting the SPS interval. According to certain embodiments, the methods for selecting the SPS interval may include any one or more of: a cell-based selection method, a device-based selection method, a QCI-based selection method, and a load-based selection method.

At step 405, it is determined whether a cell-based selection method was selected at step 400. If a cell-based selection method was selected, network node 115 uses the same SPS interval for all wireless devices 110 in a cell 125. In a particular embodiment, if the number of wireless devices in a cell 125 is less than a threshold, network node 115 may decided to use cell-based selection and assign the same short SPS interval to all wireless devices 110. In a particular embodiment, the short SPS interval may be on the order of 1 ms.

If cell-based selection method is not selected, network node 115 may determine, at step 415, whether a device-based selection method was selected at step 400. If a device-based selection method was selected, network node 115 may check a priority of a wireless device 110, at step 420. In a particular embodiment, for example, network node 115 may determining the priority of the wireless device based on a subscriber profile identifier associated with a user of the wireless device.

At step 425, a determination may be made as to whether the wireless device 110 is considered a VIP wireless device. If the wireless device 110 is a VIP wireless device, network node 115 may select a shorter SPS interval than if the wireless device 110 were a non-VIP wireless device. In a particular embodiment, for example, network node 115 may schedule a VIP wireless device 110 with a short SPS interval of approximately 1 ms. Conversely, if the wireless device 110 is not a VIP wireless device, network node 115 may assign a SPS interval that is longer than 1 ms and/or continue to step 435 to determine if a QCI-based selection method was selected at step 400.

If it is determined at step 435 that a QCI-based selection method is to be used, network node 115 may determine if a QCI is a highest priority QCI at step 440. If the QCI is a highest QCI, network node 115 may select the SPS interval that corresponds to the QCI with the highest priority at step 445. Conversely, if the QCI is not the highest priority QCI, network node 115 may determine the SPS interval at step 450 as follows:

$$\text{Interval} = \min(\forall \text{QCI}_{Interval})$$

In another embodiment, a plurality of QCIs may be associated with the wireless device. Each of the QCIs may be associated with a particular SPS interval. In this scenario, network node 115 may assign the SPS interval by selecting a SPS interval from the plurality of SPS intervals that corresponds to a particular one of the plurality of QCIs with a highest priority.

Turning to FIG. 4B, at step 455, it may be determined that a load-based selection method was selected at step 400. Network node 115 may then monitor system resources, at step 460. In a particular embodiment, the system resources may be monitored during a measurement window to determine a measure of available resources in the cell. Network node 115 may then assign the SPS interval to the wireless device based on the measure of available resources in the cell.

In a particular embodiment, network node 115 may determining an actual amount of resources utilized by all wireless devices scheduled in the cell during a transmission time interval. The actual amount of resources utilized by all wireless devices scheduled in the cell during the transmission time interval may be filtered over the measurement window, where the measurement window comprises one or more transmission time intervals. In a particular embodiment, network node 115 may determine the measure of the available resources in the cell based on a difference between a total amount of resources utilized during the one or more transmission time intervals of the measurement window and an amount of resources filtered over the measurement window.

According to certain embodiments, the utilized resources may be compared to at least one threshold. For example, in a particular embodiment, a measure of the actual amount of resources utilized by all wireless devices scheduled in the cell during the transmission time interval as filtered over the measurement window may be compared to a threshold. If the measure of the actual amount of resources utilized by all wireless devices scheduled in the cell during the transmission time interval as filtered over the measurement window is less than a threshold, selecting a first SPS interval. Conversely, if the measure of the actual amount of resources utilized by all wireless devices scheduled in the cell during the transmission time interval as filtered over the measurement window is not less than the threshold, selecting a second SPS interval.

As another example, in a particular embodiment, the utilized resources may be compared to multiple thresholds at steps 465-485 and the SPS interval may be selected based on the appropriate threshold. For example, at step 465, the actual amount of utilized resources may be compared to a first threshold, which may be a very low threshold. If it is determined at step 465, that the utilized resources are less than the very low threshold, network node 115 may select a first SPS interval at step 470.

If instead it is determined, however, that the utilized resources are greater than or equal to the first threshold, the method may continue to step 475, in a particular embodiment. At step 475, network node 115 may compare the utilized resources to a second threshold, which may be a low threshold. If it is determined at step 475 that the utilized resources are less than the second threshold, a second SPS interval may be selected at step 480.

However, if it is determined, that the utilized resources are greater than or equal to the second threshold, the method may continue to step 485, in a particular embodiment. At step 485, network node 115 may compare the utilized resources to a third threshold, which may be a medium threshold, in a particular embodiment. If the utilized resources are less than the third threshold, a third SPS interval may be selected at step 490.

If instead it is determined, however, that the utilized resources are greater than or equal to the third threshold, the method may continue to step 492, in a particular embodiment. At step 492, network node 115 may determine if the utilized resources are less than or equal to a fourth threshold, which may be a high threshold. If network node 115 determines that the utilized resources are less than the fourth threshold, network node 115 may select a fourth interval at step 494. Conversely, if network node 15 determines that the utilized resources are greater than or equal to the fourth threshold, network node 115 may select a fifth interval at step 496.

Various modifications to the method may be made. For example, certain embodiments may comprise more or fewer actions, and the actions may be performed in any suitable order. As another example, though FIG. 4 depicts the various selection methods being performed in the alternative (i.e., device-based selection is performed only if cell-based selection is not), it is recognized that network node 115 may select the SPS interval using any combination of cell-based selection, device-based selection, QCI-based selection, and/or load-based selection. For example, network node 115 may perform steps 420-430, which are associated with the device-based selection method, and steps 440, which is associated with the QCI-based selection method, and assign the SPS interval based on both selection methods.

In a particular embodiment, a network node 115 may assign weights to the different selection methods being used. For example, a network node 115 may perform both UE-based selection and load-based selection but give more weight to the UE-based selection. Another network node 115 may give more weight to the load-based selection.

It is further recognized that the SPS interval may be dynamically assigned. Thus, network node 115 may perform some or all of the steps illustrated in FIG. 4 to determine a SPS interval. However, if traffic in the cell 125 changes or the load at network node 115 changes, network node 115 may assign a new SPS interval based on the changes.

Figure 5:
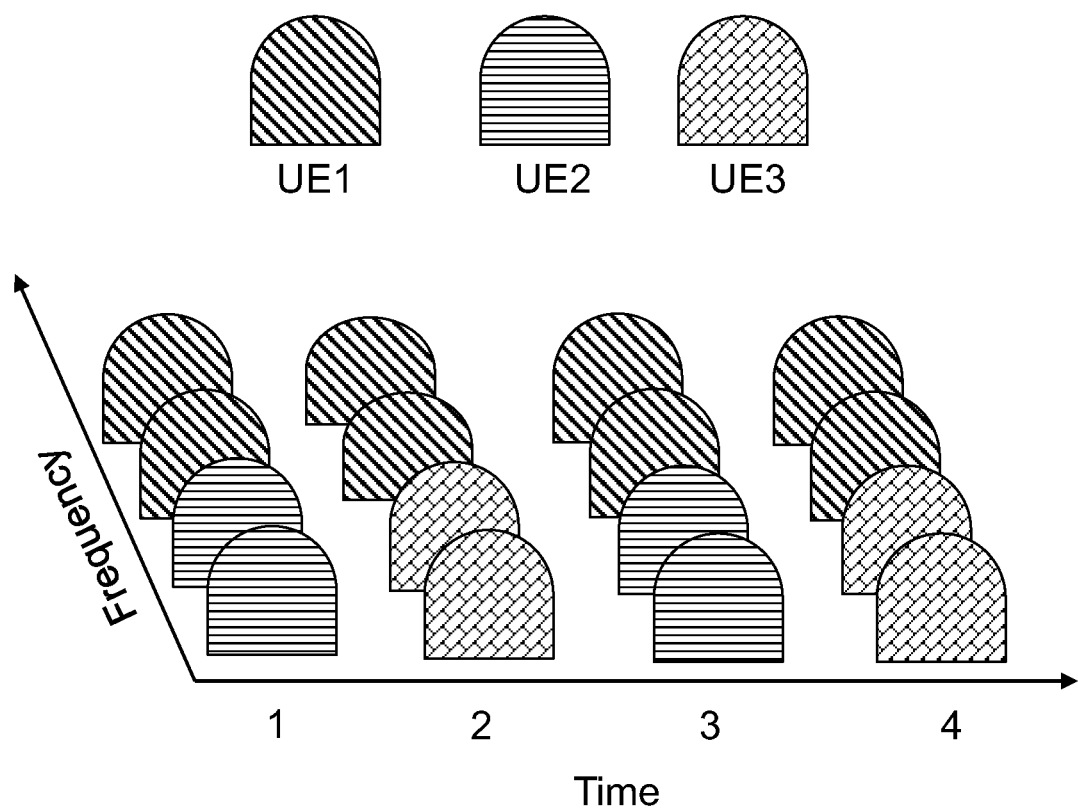
FIG. 5 illustrates an example distribution of frequency-time resources when different SPS intervals are assigned to different wireless devices in a cell, according to certain embodiments.

FIG. 5 illustrates an example distribution of frequency-time resources when different SPS intervals are assigned to different wireless devices in a cell, according to certain embodiments. As depicted, network node 115 assigns resources to three UEs. At a first and third time intervals, resources are divided between UE1 and UE2. However, at second and fourth time intervals, resources are divided between UE1 and UE3. Thus, UE 1 is assigned a short 1 ms SPS interval, and both of UE2 and UE3 are assigned a short 2 ms SPS interval. By supporting different SPS intervals for different UEs, resources can be time shared by more UEs in the system.

Figure 6:
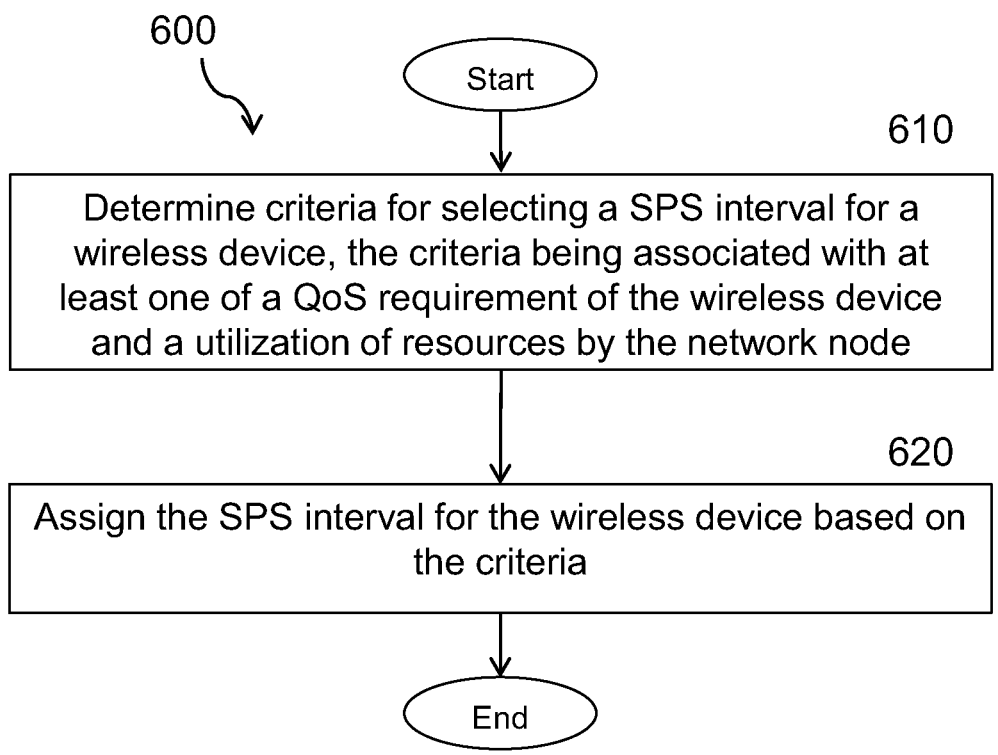
FIG. 6 illustrates another example method by a network node for selecting a SPS interval for a grant-free type of transmission from a wireless device, according to certain embodiments.

FIG. 6 illustrates another example method by a network node for selecting a SPS interval for a grant-free type of transmission from a wireless device 110, according to certain embodiments. The method begins at step 610 when network node 115 determines criterion for selecting the SPS interval for the wireless device 110. According to certain embodiments, the criterion being associated with at least one of a QoS requirement of the wireless device and a utilization of resources by the network node.

In a particular embodiment, the criterion is associated with a priority of the wireless device, and network node 115 may assign the SPS interval based on the priority of the wireless device.

At step 620, network node 115 assigns the SPS interval to the wireless device based on the criterion.

In a particular embodiment, the method may further include determining whether wireless device 110 is a VIP wireless device. In a particular embodiment, the priority of wireless device 110 may be determined based on a subscriber profile identifier associated with a user of wireless device 110. According to certain embodiments, if wireless device 110 is a VIP wireless device, network node 115 may assign a shorter SPS interval. Conversely, if wireless device 110 is not a VIP wireless device, network node 115 may assign a longer SPS interval. In a particular embodiment, the shorter SPS interval may be on the order of 1 ms.

In a particular embodiment, the criterion may be associated with a QCI, and network node 115 may further operate to determine at least one QCI associated with wireless device 110. Network node may then assign the SPS interval to wireless device 110 based on the at least one QCI associated with wireless device 110.

In a particular embodiment, wireless device 110 may be associated with a plurality of QCIs, and each QCI may be associated with a respective one of a plurality of SPS intervals. Network node 115 may select a SPS interval that corresponds to a particular one of the plurality of QCIs with a highest priority when assigning the SPS interval.

In a particular embodiment, the criterion may be associated with the utilization of resources by the network node, and network node 115 may operate to monitor system resources during a measurement window to determine a measure of available resources in the cell 125. Network node 115 may assign the SPS interval based on the measure of available resources in the cell.

For example, in a particular embodiment, network node 115 may determine an actual amount of resources utilized by all wireless devices 110 scheduled in the cell 125 during a transmission time interval. Network node 115 may filter the actual amount of resources utilized by all wireless devices 110 scheduled in the cell 125 during the transmission time interval over the measurement window. The measurement window may include one or more transmission time intervals. In a particular embodiment, network node 115 may determine the measure of available resources in cell 125 based on a difference between the average available during measurement period and the filtered amount of resources utilized during the measurement window.

In another example embodiment, network node 115 may compare a measure of the actual amount of resources utilized by all wireless devices 110 scheduled in cell 125 as filtered over the measurement window to a threshold. If the measure of the actual amount of resources utilized by all wireless devices 110 scheduled in the cell 125 during the transmission time interval as filtered over the measurement window is less than a threshold, network node 115 may select a first SPS interval. Conversely, if the measure of the actual amount of resources utilized by all wireless devices 110 scheduled in the cell 125 during the transmission time interval as filtered over the measurement window is not less than the threshold, network node 115 may select a second SPS interval.

In yet another example embodiment, network node 115 may compare the measure of the available resources in cell 125 to a plurality of thresholds that are each associated with a selected one of a plurality of SPS intervals. For example, a shorter SPS interval may be associated with a lowest threshold and a longer SPS interval may be associated with a highest threshold.

At some point, network node 115 may determine that the QoS requirements of wireless device 110 or the utilization of resources by network node 115 has changed since the assignment of the SPS interval. Network node 115 may then adjust the SPS interval for wireless device 110 in response to determining that the at least one of the QoS requirement of wireless device 110 or the utilization of resources by network node 115 has changed.

Figure 7:
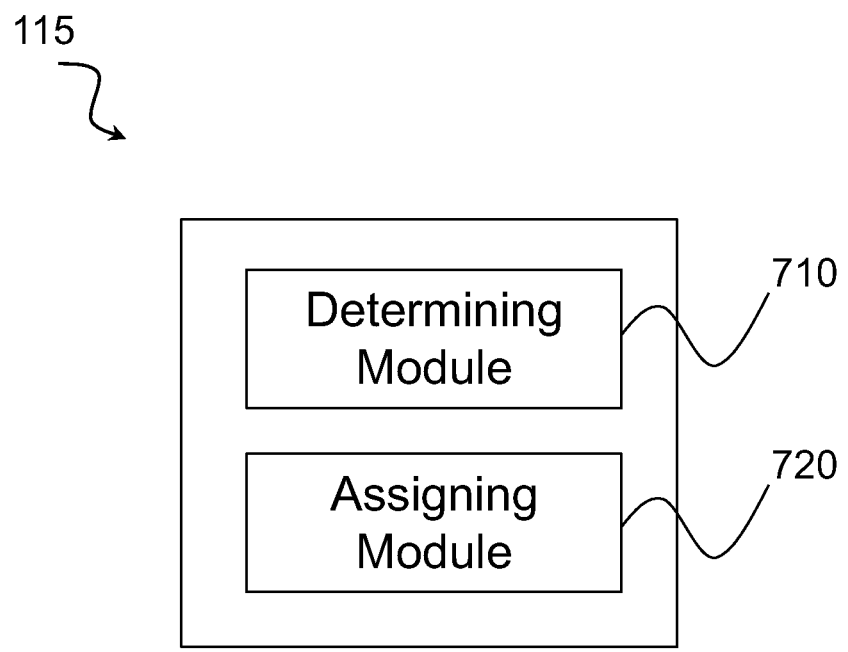
FIG. 7 illustrates an example virtual computing device for selecting a SPS interval for a grant-free type of transmission from a wireless device, according to certain embodiments.

In certain embodiments, the method for selecting a SPS interval for a grant-free type of transmission from a wireless device. FIG. 7 illustrates an example virtual computing device for selecting a SPS interval for a grant-free type of transmission from a wireless device, according to certain embodiments. In certain embodiments, virtual computing device 600 may include modules for performing steps similar to those described above with regard to the method illustrated and described in FIG. 6. For example, virtual computing device 700 may include a determining module 710, an assigning module 720, and any other suitable modules for selecting a SPS interval for a grant-free type of transmission from a wireless device 110. In some embodiments, one or more of the modules may be implemented using processing circuitry 320 of FIG. 3. In certain embodiments, the functions of two or more of the various modules may be combined into a single module.

The determining module 710 may perform certain of the determining functions of virtual computing device 700. For example, in a particular embodiment, determining module 710 may determine criterion for selecting the SPS interval for the wireless device 110.

The assigning module 720 may perform certain of the assigning functions of virtual computing device 700. For example, in a particular embodiment, assigning module 720 may assign the SPS interval to the wireless device 110 based on the criterion.

Other embodiments of virtual computing device 700 may include additional components beyond those shown in FIG. 7 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 8:
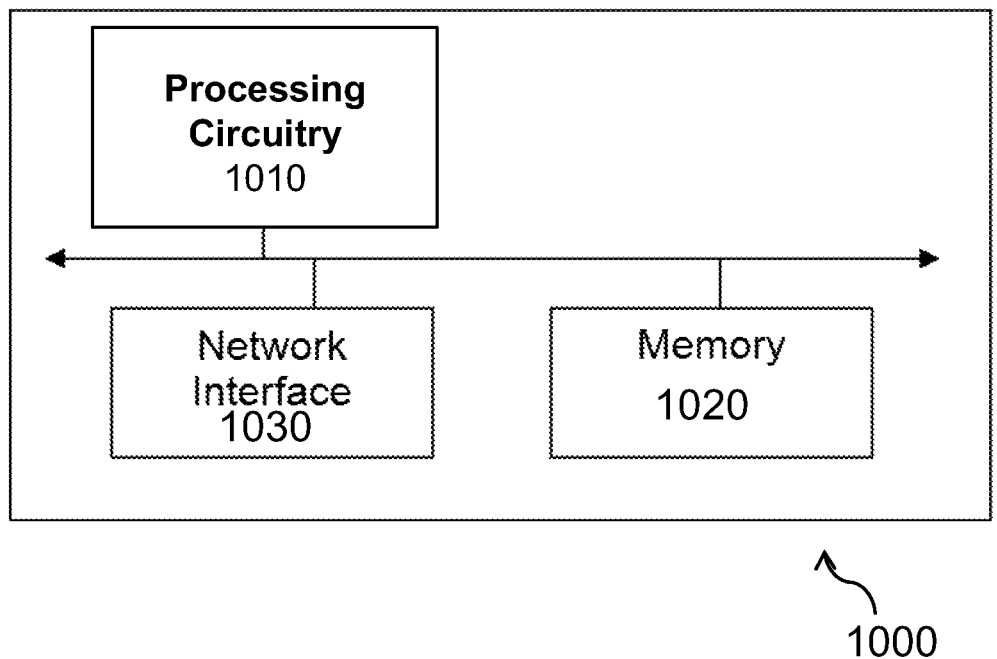
FIG. 8 illustrates an exemplary radio network controller or core network node, in accordance with certain embodiments.

FIG. 8 illustrates an example radio network controller or core network node 800, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 810 (e.g., which may include one or more processors), network interface 820, and memory 830. In some embodiments, processing circuitry 810 executes instructions to provide some or all of the functionality described above as being provided by the network node, memory 830 stores the instructions executed by processing circuitry 810, and network interface 820 communicates signals to any suitable node, such as a gateway, switch, router, Internet, Public Switched Telephone Network (PSTN), network nodes 115, radio network controllers or core network nodes, etc.

Processing circuitry 810 may include any suitable combination of hardware and software implemented in one or more modules to execute instructions and manipulate data to perform some or all of the described functions of the radio network controller or core network node. In some embodiments, processing circuitry 810 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 820 is communicatively coupled to processing circuitry 810 and may refer to any suitable device operable to receive input for the network node, send output from the network node, perform suitable processing of the input or output or both, communicate to other devices, or any combination of the preceding. Network interface 820 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
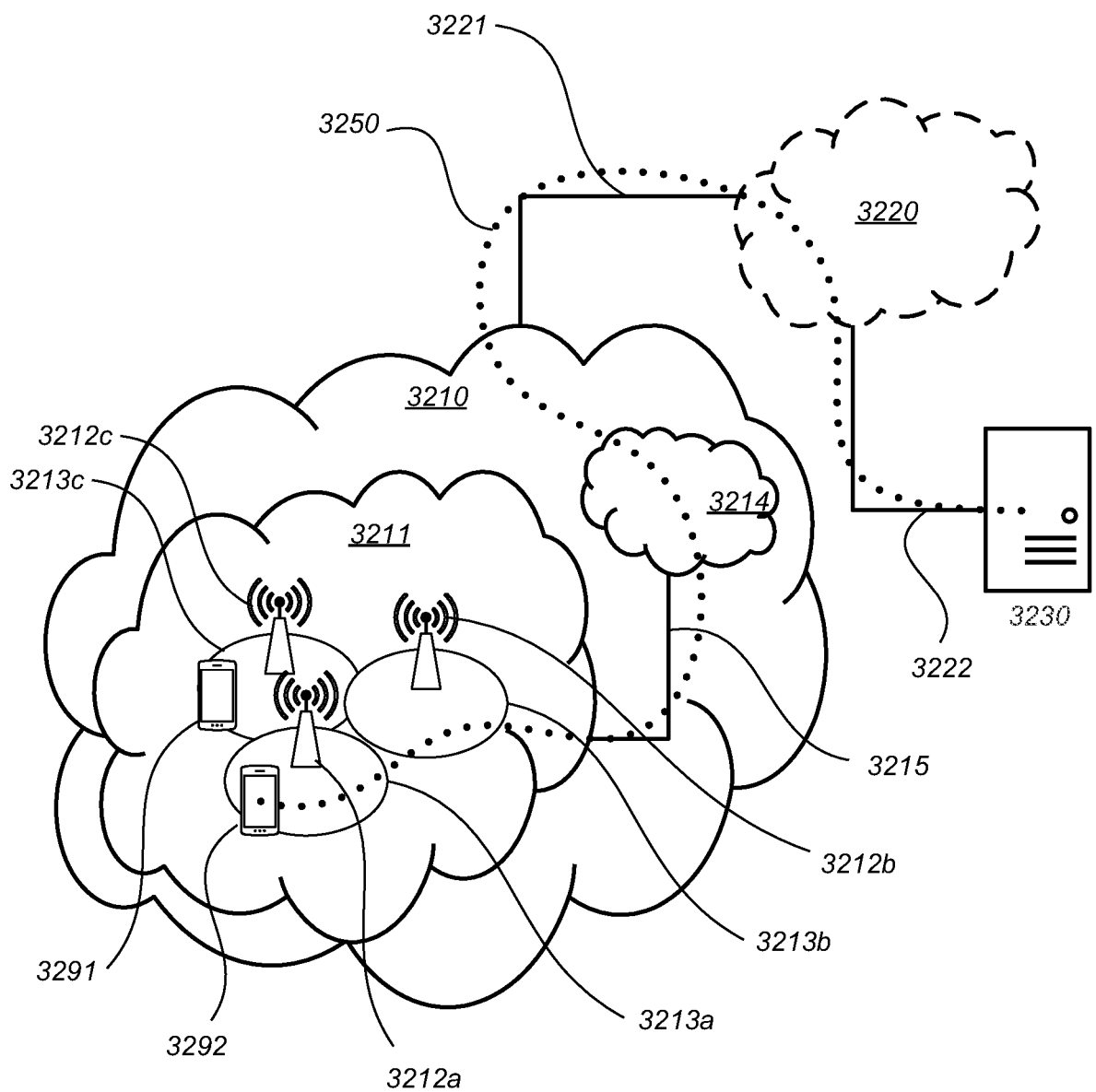
FIG. 9 illustrates a telecommunication network connected via an intermediate network to a host computer, according to certain embodiments.

FIG. 9 schematically illustrates a telecommunication network connected via an intermediate network to a host computer, according to certain embodiments. In accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Figure 10:
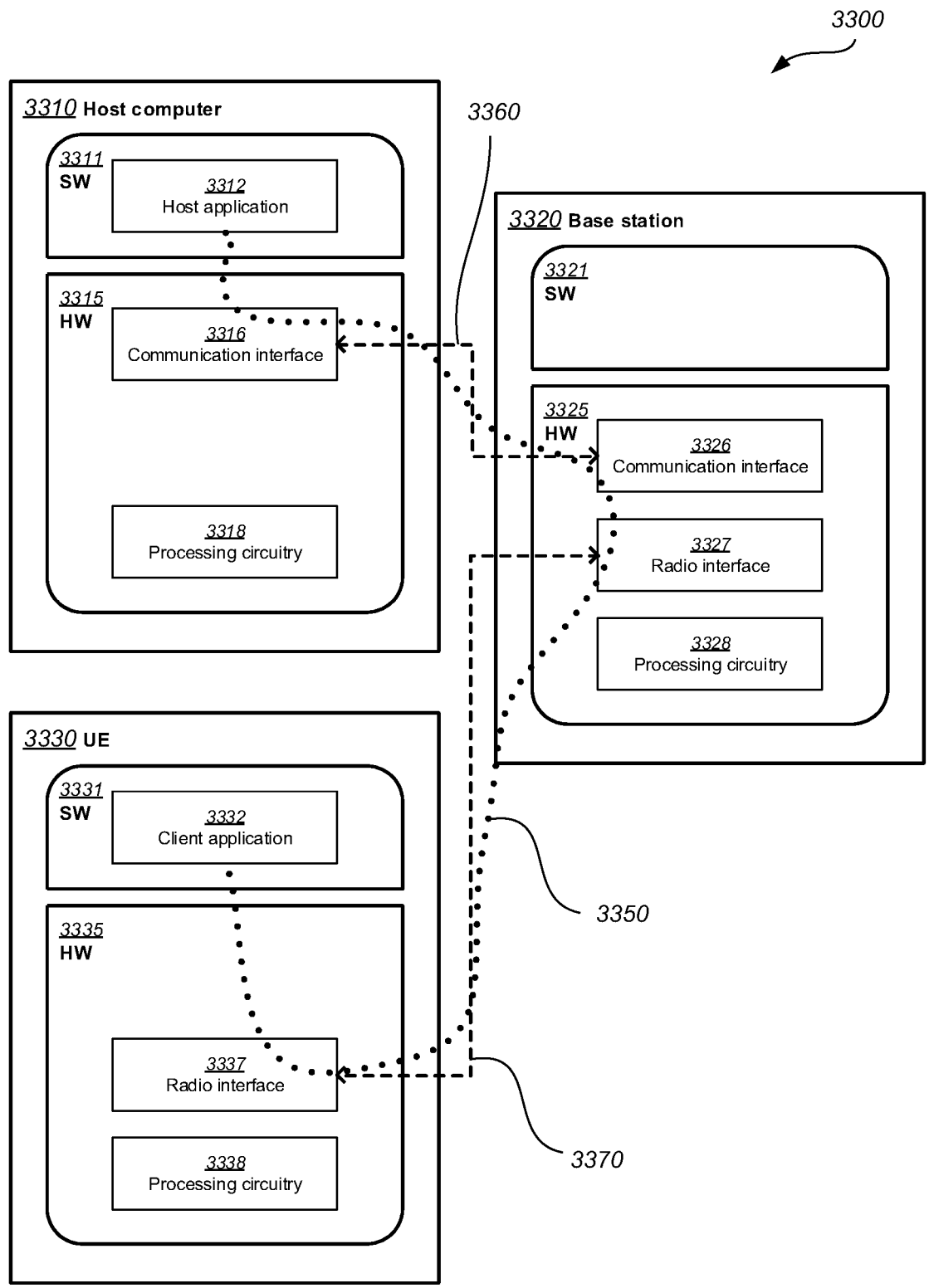
FIG. 10 illustrates a host computer communicating via a base station with a user equipment over a partially wireless connection, according to certain embodiments.

FIG. 10 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 9. In a communication system 1100, a host computer 3110 comprises hardware 3115 including a communication interface 3316 configured to set up and maintain a wired or wireless connection with an interface of a different communication device of the communication system 1100. The host computer 3110 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3110 further comprises software 3311, which is stored in or accessible by the host computer 3110 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3110. In providing the service to the remote user, the host application 3312 may provide user data which is transmitted using the OTT connection 3350.

The communication system 1100 further includes a base station 3320 provided in a telecommunication system and comprising hardware 3325 enabling it to communicate with the host computer 3110 and with the UE 3330. The hardware 3325 may include a communication interface 3326 for setting up and maintaining a wired or wireless connection with an interface of a different communication device of the communication system 1100, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3110. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 1100 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3110. In the host computer 3110, an executing host application 3312 may communicate with the executing client application 3332 via the OTT connection 3350 terminating at the UE 3330 and the host computer 3110. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3110, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3110 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3110, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and/or latency and thereby provide benefits such as reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring the OTT connection 3350 between the host computer 3110 and UE 3330, in response to variations in the measurement results. The measurement procedure and/or the network functionality for reconfiguring the OTT connection 3350 may be implemented in the software 3311 of the host computer 3110 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3110 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
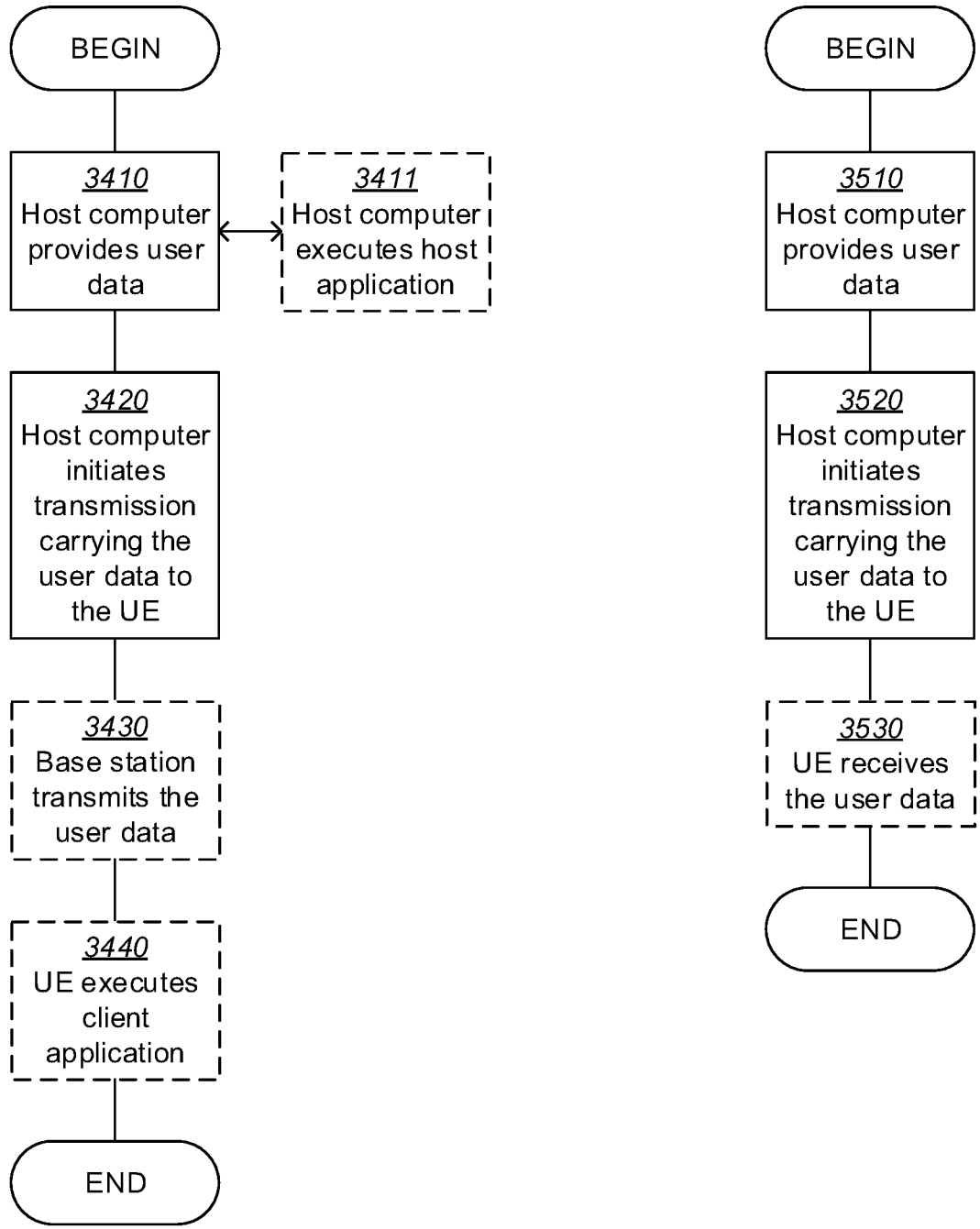
FIG. 11 illustrates a method implemented in a communication system, according to certain embodiments.
FIG. 12 illustrates another method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3310 of the method, the host computer provides user data. In an optional substep 3411 of the first step 3310, the host computer provides the user data by executing a host application. In a second step 3320, the host computer initiates a transmission carrying the user data to the UE. In an optional third step 3330, the base station transmits to the UE the user data which was carried in the transmission that the host computer initiated, in accordance with the teachings of the embodiments described throughout this disclosure. In an optional fourth step 3340, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Abbreviations

| Abbreviation | Explanation |
| --- | --- |
| 3GPP | 3$^{rd}$ Generation Partnership Project |
| 5G | 5$^{th}$ Generation |
| BER | Bit Error Rate |
| C-MTC | Critical MTC (Also referred to as Ultra Reliable and Low Latency Communication (URLLC).) |
| CP | Cyclic Prefix |
| DMRS | Demodulation Reference Signal |
| eNB | Evolved NodeB |
| gNB | The term for a radio base station in NR (corresponding to eNB in LTE). |
| ID | Identity/Identifier |
| IE | Information Element |
| IM | Index Modulation |
| LTE | Long Term Evolution |
| MIB | Master Information Block |
| MIMO | Multiple-Input Multiple-Output |
| ML | Maximum Likelihood Detection |
| MSG | Message |
| M-MTC | Massive MTC |
| MTC | Machine Type Communication |
| NGC | Next Generation Core |
| NR | New Radio (The term used for the 5G radio interface and radio access network in the technical reports and standard specifications 3GPP are working on.) |
| OFDM | Orthogonal Frequency Division Multiple Access |
| PBCH | Physical Broadcast Channel |
| PCI | Physical Cell Identity |
| PDCCH | Physical Downlink Control Channel |
| PDSCH | Physical Downlink Shared Channel |
| PLMN | Public Land Mobile Network |
| PRACH | Physical Random Access Channel |
| PSS | Primary Synchronization Signal |
| QAM | Quadrature Amplitude Modulation |
| QCL | Quasi-Co-Located |
| RA | Random Access |
| RAN | Random Access Network |
| RAR | Random Access Response |
| RMSI | Remaining Minimum System Information |
| RRC | Radio Resource Control |
| SFN | Single Frequency Network |
| SI | System Information |
| SIB | System Information Block |
| SM | Spatial Modulation |
| SNR | Signal to Noise Ratio |
| SS | Synchronization Signal |
| SSS | Secondary Synchronization Signal |
| TRP | Transmission/Reception Point |
| UE | User Equipment |
| UL | Uplink |

The invention claimed is:

1. A method by a network node for selecting a semi-persistent scheduling (SPS) interval for a wireless device in a cell served by the network node, the method comprising:
determining criterion for selecting the SPS interval for the wireless device, the criterion being associated with at least one of:
a QoS requirement of the wireless device; and
a utilization of resources by the network node; and
assigning the SPS interval to the wireless device based on the criterion.

2. The method of claim 1, wherein:
the criterion is associated with a priority of the wireless device, and
the SPS interval is assigned based on the priority of the wireless device.

3. The method of claim 2, further comprising determining whether the wireless device is a VIP wireless device, and wherein assigning the SPS interval comprises:
assigning a shorter SPS interval if the wireless device is a VIP wireless device; and
assigning a longer SPS interval if the wireless device is not a VIP wireless device.

4. The method of claim 3, wherein the shorter SPS interval is for a time interval of 1 ms.

5. The method of claim 2, further comprising determining the priority of the wireless device based on a subscriber profile identifier associated with a user of the wireless device.

6. The method of claim 1, wherein the criterion is associated with a Quality of Service Class Identifier (QCI), and the method further comprises determining at least one QCI associated with the wireless device, and wherein assigning the SPS interval to the wireless device comprises assigning the SPS interval based on the at least one QCI associated with the wireless device.

7. The method of claim 6, wherein:
a plurality of QCIs are associated with the wireless device,
each of the plurality of QCIs are associated with a respective one of a plurality of SPS intervals, and
assigning the SPS interval comprises selecting a SPS interval from the plurality of SPS intervals that corresponds to a particular one of the plurality of QCIs with a highest priority.

8. The method of claim 1, wherein the criterion is associated with the utilization of resources by the network node, and the method further comprises monitoring system resources during a measurement window to determine a measure of available resources in the cell, and wherein assigning the SPS interval to the wireless device comprises assigning the SPS interval based on the measure of available resources in the cell.

9. The method of claim 8, wherein monitoring system resources comprises:
determining an actual amount of resources utilized by all wireless devices scheduled in the cell during a transmission time interval; and
filtering the actual amount of resources utilized by all wireless devices scheduled in the cell during the transmission time interval over the measurement window, wherein the measurement window comprises one or more transmission time intervals.

10. The method of claim 8, further comprising:
comparing a measure of the actual amount of resources utilized by all wireless devices scheduled in the cell during the transmission time interval as filtered over the measurement window to a threshold;
if the measure of the actual amount of resources utilized by all wireless devices scheduled in the cell during the transmission time interval as filtered over the measurement window is less than a threshold, selecting a first SPS interval; and
if the measure of the actual amount of resources utilized by all wireless devices scheduled in the cell during the transmission time interval as filtered over the measurement window is not less than the threshold, selecting a second SPS interval.

11. The method of claim 8, further comprising:
comparing the measure of available resources in the cell to a plurality of thresholds, each of the plurality of thresholds being associated with a selected one of a plurality of SPS intervals, and wherein a shorter SPS interval is associated with a lowest threshold and a longer SPS interval is associated with a highest threshold.

12. The method of claim 1, further comprising:
  determining that the QoS requirements of the wireless device or the utilization of resources by the network node has changed since the assignment of the SPS interval; and
  adjusting the SPS interval for the wireless device in response to determining that the at least one of the QoS requirement of the wireless device or the utilization of resources by the network node has changed.

13. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs
  determining criterion for selecting the SPS interval for the UE, the criterion being associated with at least one of:
  a QoS requirement of the UE; and
  a utilization of resources by the base station; and
  assigning the SPS interval to the UE based on the criterion.

14. A network node for selecting a semi-persistent scheduling (SPS) interval for a wireless device in a cell served by the network node, the method comprising:
  a memory storing instructions; and
  processing circuitry configured to execute the instructions to cause the network node to:
  determine criterion for selecting the SPS interval for the wireless device, the criterion being associated with at least one of:
  a QoS requirement of the wireless device; and
  a utilization of resources by the network node; and
  assign the SPS interval to the wireless device based on the criterion.

15. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to:
  determine criterion for selecting the SPS interval for the UE, the criterion being associated with at least one of:
  a QoS requirement of the UE; and
  a utilization of resources by the base station; and
  assign the SPS interval to the UE based on the criterion.

* * * * *